United States Patent
Yano et al.

[11] Patent Number: 4,896,933
[45] Date of Patent: Jan. 30, 1990

[54] HIGHER HARMONIC GENERATOR

[75] Inventors: Seiki Yano, Kashihara; Mitsuhiro Matsumoto, Tenri; Toshiki Hijikata, Nara, all of Japan

[73] Assignee: Sharp Kabushiki Kaisha, Osaka, Japan

[21] Appl. No.: 267,730

[22] Filed: Nov. 4, 1988

Related U.S. Application Data

[63] Continuation of Ser. No. 875,735, Jun. 18, 1986, abandoned.

[30] Foreign Application Priority Data

Jun. 18, 1985 [JP] Japan .............................. 60-133558

[51] Int. Cl.$^4$ .............................................. G02F 1/37
[52] U.S. Cl. ................................. 350/96.15; 307/430; 307/427; 350/96.12; 350/96.29
[58] Field of Search ...................... 307/425–430; 350/96.11, 96.12, 96.13, 96.14, 96.15, 96.29, 96.30, 96.34

[56] References Cited

U.S. PATENT DOCUMENTS

| | | | |
|---|---|---|---|
| 3,619,795 | 11/1971 | Marcatili | 350/96.12 X |
| 3,822,927 | 7/1974 | Zernike | 350/96.12 |
| 4,236,785 | 12/1980 | Papuchon et al. | 350/96.14 |
| 4,394,060 | 7/1983 | Verber et al. | 350/96.12 X |
| 4,557,551 | 12/1985 | Dyott | 350/96.15 |
| 4,583,817 | 4/1986 | Papuchon | 350/96.12 X |
| 4,763,019 | 8/1988 | Duguay et al. | 307/427 |
| 4,780,543 | 10/1988 | Gordon et al. | 350/96.12 X |
| 4,792,208 | 12/1988 | Ulman et al. | 350/96.34 |

*Primary Examiner*—John D. Lee
*Attorney, Agent, or Firm*—Birch, Stewart, Kolasch & Birch

[57] ABSTRACT

A higher harmonic wave generator, comprising: (1) a first optical waveguide made of a nonlinear optical material, having a structure which can guide the incident fundamental wave; and (2) a second optical waveguide made of nonlinear optical material, connected to the first optical wave guide optically, having a structure which can guide a higher harmonic wave of the fundamental wave; wherein the effective refractive index of the first optical waveguide is made to be equal to the effective refractive index of the second optical waveguide.

9 Claims, 2 Drawing Sheets

HIGHER HARMONIC GENERATOR

This application is a continuation of application Ser. No. 875,735 filed on June 18, 1986, now abandoned.

BACKGROUND OF THE INVENTION

1. Field of the Invention

The present invention relates to a semiconductor laser device which can generate an optical higher harmonic wave.

2. Description of the Prior Art

Many workers have tried to generate an optical higher harmonic wave by using nonlinear optical material in order to convert infrared light to visible light. A higher harmonic wave can be generated by making use fo the nonlinearity of the refractive index and polarizability of the optical material. Unfortunately, the conversion ratio is very small because the nonlinear constants of a nonlinear optical material are very small.

The conversion efficiency $\eta$ from a fundamental wave to a second harmonic wave can approximately be given as follows:

$$\eta = 2 \left( \frac{\mu_0}{\epsilon_0} \right)^{3/2} \frac{\omega^2 d^2 l^3}{n^3} \frac{\sin^2(\Delta k \cdot l/2)}{(\Delta k \cdot l/2)} \frac{P\omega}{A},$$

where $\Delta K$ is a difference between the wave number of the second harmonic wave and that of the fundamental wave, l and d are the length and the width of a nonlinear medium (optical waveguide), respectively, A is a sectional area of the optical waveguide, and P is the power of the incident fundamental wave.

The formula shows that the enhancement of conversion efficiency $\eta$ needs an increase in the length l of nonlinear medium (optical waveguide), an increase in the power density $P\omega/A$ of the incident fundamental wave, and/or a phase matching between the fundamental wave and the second harmonic wave in order to decrease the difference $\Delta k \cdot l$ in phase to zero. For example, $\eta$ becomes 1.5% if lithium niobate (LiNbO$_3$) is used for the nonlinear optical material and the incident fundamental wave of $10^7$W/cm$^2$ of $P\omega/A$ (which is equivalent to the case that an incident fundamental wave of 100 mW is introduced into on an optical waveguide having a sectional area of 1 $\|$ m $\times$ 1 $\mu$m) is guided in an optical waveguide of 1 mm of length.

As for the enhancement due to an increase in $P\omega/A$, Uesugi et al. (Oyo Butsuri, Vol. 49, No. 12 (1980) P. 1234–1238 (in Japanese)) obtained a high conversion efficiency of 0.77% based upon an experiment for generating a second harmonic wave in use of a three-dimensional optical waveguide of LiNbO$_3$. However, their method requires a very high precision in arranging crystal axes and in controlling the temperature because the phase matching is obtained in such a manner that the refractive index of ordinary rays and that of extraordinary rays are made equal by making use of temperature dependences of these refractive indexes. Therefore, it is very difficult to obtain a high conversion efficiency. Then, they tried to increase the conversion efficiency by making the length l of the optical waveguide a few cenimeters longer which is one or more orders of magnitude longer than that of an ordinary optical waveguide.

SUMMARY OF THE INVENTION

A purpose of the present invention is to provide a semiconductor laser device which has a high conversion efficiency for generating a higher harmonic wave.

A higher harmonic wave generator according to the present invention comprises a first optical waveguide made of nonlinear optical material, having a structure which can guide the incident fundamental wave; and a second optical waveguide made of nonlinear optical material, optically connected to said first optical wave guide, having a structure which can guide a higher harmonic wave of the fundamental wave; and the effective refractive index of said first optical waveguide and that of said second optical waveguide are equalized to each other.

An advantage of the present invention is that it can provide a higher harmonic generator of a high conversion ratio.

BRIEF DESCRIPTION OF THE DRAWINGS

Embodiments of the present invention will now be described with reference to the accompanying drawings, inwhich.

DETAILED DESCRIPTION OF THE EMBODIMENTS

Figure 1:
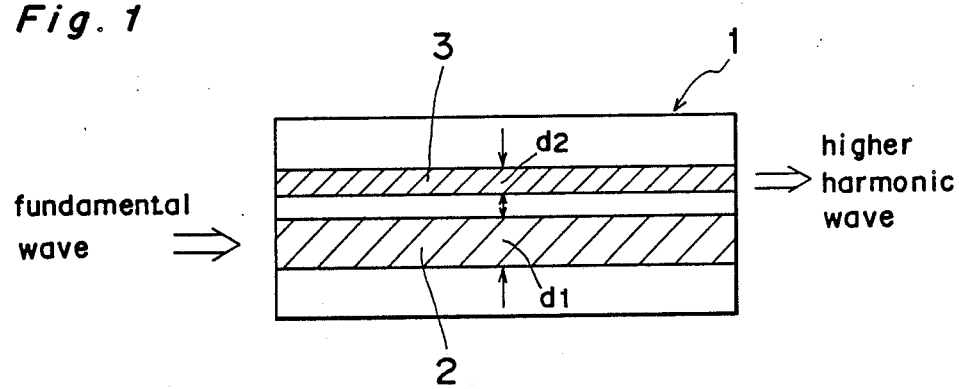
FIG. 1 is a schematic plan view of an embodiment of a higher harmonic generator according to the present invention.

A higher harmonic generator according to the present invention is displayed in FIG. 1. The illustrated device has an optical waveguide 2 having a structure which can guide the fundamental wave and another optical waveguide 3 having a structure which can guide the second harmonic wave, both arranged parallel to each other; both optical waveguides are connected to each other optically, though not shown in FIG. 1. Both optical waveguides 2 and 3 can be combined optically according to the amplitudes of refractive index and the length of the optical waveguides.

Figure 2:
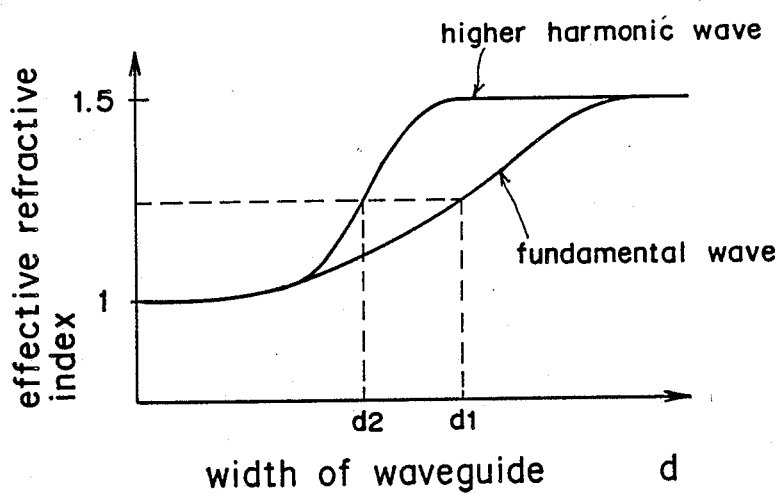
FIG. 2 is a graph which shows the dependence of the effective refractive index on the width of optical waveguide.

As shown in FIG. 2, the dependence of the effective refractive index of the optical waveguide on the width of the optical waveguide for the fundamental wave differs from that of the second harmonic wave when the optical waveguides are made of the same nonlinear material. The widths d1 and d2 of both optical waveguides 2 and 3 are chosen so that the effective refractive indexes become equal to each other. Then, the phase velocity of the fundamental wave becomes equal to that of the second harmonic wave, and the difference $\Delta k \cdot l$ of phase between the fundamental wave and the second harmonic wave vanishes so that the phase matching is realized. This enhances the conversion efficiency $\eta$.

EMBODIMENT 1

Figure 3:
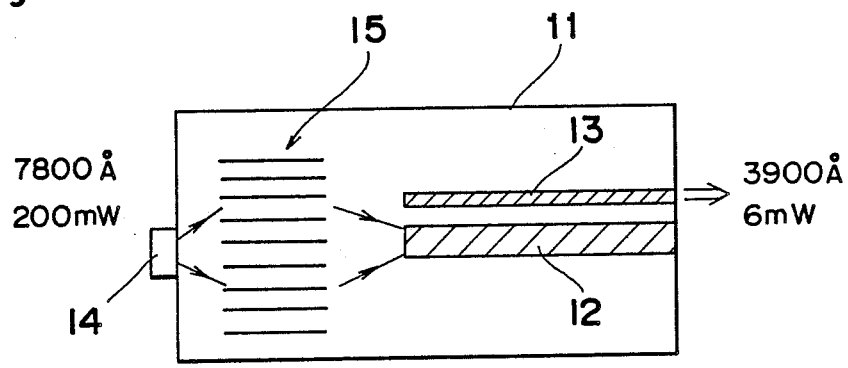
FIG. 3 is a schematic plan view of a blue-color laser generator.

FIG. 3 shows a blue-color laser generator. An optical waveguide 12 of width 2 $\mu$m of the fundamental wave and another optical waveguide 13 of width 1 $\mu$m of the second harmonic wave are formed with a spacing of 1

μm from the central part to the right end surface of a rectangle 11 of LiNbO₃. Both waveguides 12 and 13 are prepared by diffusing 1 titanium μm at 1000° C. in a semicircular direction with respect to the depth. The lengths l of the optical waveguide 12 and 13 are 1 mm. On the other hand, a semiconductor laser array (Wavelength 7800 Å, output power 200 mW) 14 is attached at the left end surface, and grating lenses 15 are formed at the right part of the rectangle 11 in order to effectively guide the light emitted from the semiconductor laser array 14 to the optical waveguide 12 of the fundamental wave. A device thus produced can emit laser light of wavelength 3900 Å up to 6 mW for the fundamental wave of wavelength 7800 Å of 200 mW. That is, the conversion efficiency $\eta$ is 2% which is nearly equal to the theoretical value.

EMBODIMENT 2

Figure 4:
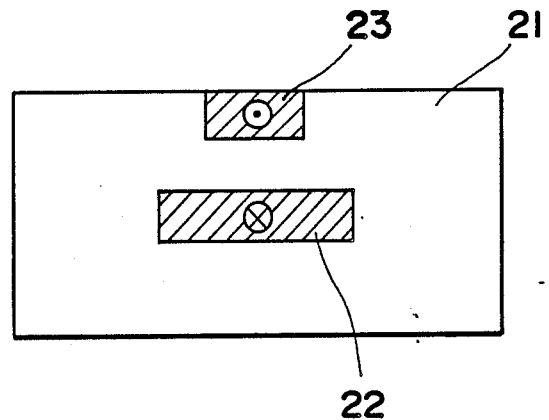
FIGS. 4 and 5 are sectional views of second and third embodiments according to the present invention, respectively.

As shown in FIG. 4, a higher harmonic generator 21 of a rectangle has an optical waveguide 22, which guides the fundamental wave, and another optical waveguide 23 which guides the second higher harmonic wave, where the ends of the waveguides are connected and arranged in parallel. Other conditions such as the widths d1 and d2 of both optical waveguides 22 and 23 are chosen so that the effective refractive indexes of both optical waveguides 22 and 23 become equal to each other, as in Embodiment 1.

The fundamental wave is emitted into the optical waveguide 22 in a downward direction to the paper on which FIG. 4 is drawn, while the second harmonic wave is emitted from the optical waveguide 23 from below the paper in the upward direction of FIG. 4 in contrast to Embodiment 1. The directions of the incident and emitted lights can be controlled by arranging reflection mirrors at the ends of the optical waveguides 22 and 23.

EMBODIMENT 3

Figure 5:
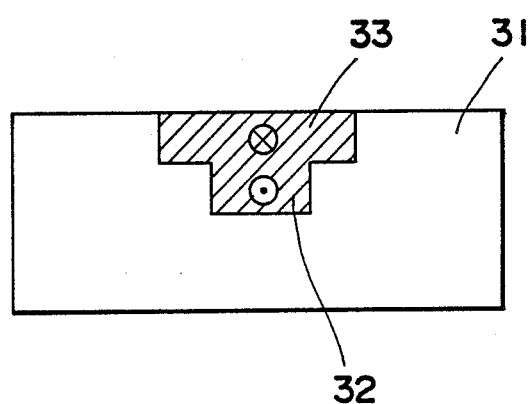

As shown in FIG. 5, a higher harmonic generator 31 of a rectangle has an optical waveguide 33, which guides the fundamental wave, and another waveguide 32 which guides the second harmonic wave, both waveguides are arranged in parallel with respect to their length and made are to contact with each other at lower face of the former waveguide 33 and at an upper face of the latter waveguide 32. Other conditions such as the width d1 and d2 of both optical waveguides 32 and 33 are chosen so that the effective refractive indexes of both optical waveguides 32 and 33 become equal to each other, as in Embodiment 1.

This arrangement of optical waveguides 32 and 33 increases the amplitude of the combination of both waveguides and enhances the conversion efficiency.

The fundamental wave is emitted into the optical waveguide 33 in a downward direction vertical to the paper on which FIG. 5 is drawn, while the second harmonic wave is emitted from the optical waveguide 32 from below the paper in an upward direction, as in Embodiment 2. The directions of the incident and emitted lights can be controlled by arranging reflection mirrors at the ends of the optical waveguides 32 and 33.

This invention may be practiced or embodied in still other ways without departing from the spirit or essential character thereof. The preferred embodiments described herein are therefore illustrative and not restrictive and all variations which come within the meaning of the claims are intended to be embraced therein.

What is claimed is:

1. A higher harmonic wave generator for generating a higher harmonic wave from an incident fundamental wave, comprising:
   first optical waveguide means of a nonlinear optical material having a first width for obtaining an effective refractive index and positioned in a first direction for guiding the incident fundamental wave; and
   second optical waveguide means of said nonlinear optical material having a second width for obtaining said effective refractive index, being optically connected to said first optical waveguide means and positioned in a parallel direction to said first direction, for generating and guiding the higher harmonic wave of the incident fundamental wave;
   wherein said first and second widths of said first and second optical waveguide means are controlled for obtaining said effective refractive index for said first and second optical waveguide means.

2. A higher harmonic wave generator as claimed in claim 1, wherein said first and second optical waveguide means comprise first and second third dimensional optical waveguides, respectively.

3. A higher harmonic wave generator according to claim 1, wherein an incident direction of the incident fundamental wave into the first optical waveguide means is in an opposite direction to an emission direction of the higher harmonic wave from the second optical waveguide means.

4. A higher harmonic wave generator according to claim 1, wherein an incident direction of the incident fundamental wave into the first optical waveguide means is in the same direction as an emission, direction of the higher harmonic wave from the second optical waveguide means.

5. A higher harmonic wave generator according to claim 1, wherein the first and second optical waveguide means are physically contacted to each other.

6. A higher harmonic wave generator for generating a higher harmonic wave from an incident laser light, comprising:
   laser emission means for emitting the incident laser light;
   lens means for producing a guided fundamental wave by guiding the laser light from said laser emission means;
   first optical waveguide means of a nonlinear optical material having a first width for obtaining an effective refractive index and positioned in a first direction for guiding the guided fundamental wave projected on one end of said first optical waveguide means; and
   second optical waveguide means of said nonlinear optical material having a second width for obtaining said effective refractive index, being optically connected to said first optical waveguide means and positioned in a parallel direction to said first direction for generating and guiding the higher harmonic wave of the guided fundamental wave;
   wherein said first and second widths of said first and second optical waveguide means are controlled for obtaining said effective refractive index for said first and second optical waveguide means.

7. A higher harmonic wave generator as claimed in claim 6, wherein said first and second optical waveguide means comprise first and second three dimensional optical waveguides, respectively.

8. A higher harmonic wave generator for generating a higher harmonic wave from an incident fundamental wave, comprising:

first optical waveguide means of a nonlinear optical material having a first width for obtaining an effective refractive index and positioned in a first direction for guiding the incident fundamental wave in an incident direction; and second optical waveguide means of said nonlinear optical material having a second width for obtaining said effective refractive index, being optically connected and physically contacted to said first waveguide means and positioned in a parallel direction to said first direction for generating and guiding the higher harmonic wave in an emission direction having an opposite direction to said incident direction of the incident fundamental wave;

wherein said first and second widths of said first and second optical waveguide means are controlled for obtaining said effective refractive index for said first and second optical waveguide means.

9. A higher harmonic wave generator for generating a higher harmonic wave from an incident fundamental wave, comprising:

first optical waveguide means of a nonlinear optical material having a first width for obtaining an effective refractive index and positioned in a first direction for guiding the incident fundamental wave in an incident direction; and second optical waveguide means of a nonlinear optical material having a second width for obtaining said effective refractive index, being optically connected to said first optical waveguide means and positioned in a parallel direction to said first direction, for guiding and generating the higher harmonic wave in an emission direction having an opposite direction to said incident direction of the incident fundamental wave;

wherein said first and second widths of said first and second optical waveguide means are controlled for obtaining said effective refractive index for said first and second optical waveguide means.

* * * * *